(12) United States Patent
Kato

(10) Patent No.: US 7,835,403 B2
(45) Date of Patent: Nov. 16, 2010

(54) STREAM ANALYSIS APPARATUS AND STREAM ANALYSIS DISPLAY METHOD

(75) Inventor: Yoshiaki Kato, Kanagawa (JP)

(73) Assignee: Tektronix, Inc., Beaverton, OR (US)

( * ) Notice: Subject to any disclaimer, the term of this patent is extended or adjusted under 35 U.S.C. 154(b) by 51 days.

(21) Appl. No.: 12/118,670

(22) Filed: May 9, 2008

(65) Prior Publication Data

US 2009/0122714 A1 May 14, 2009

(30) Foreign Application Priority Data

May 11, 2007 (JP) ............................. 2007-127307

(51) Int. Cl.
*H04J 3/06* (2006.01)

(52) U.S. Cl. .................................... 370/503

(58) Field of Classification Search ....................... None
See application file for complete search history.

(56) References Cited

U.S. PATENT DOCUMENTS

| | | | |
|---|---|---|---|
| 5,774,497 A | 6/1998 | Block et al. | |
| 5,883,924 A | 3/1999 | Siu et al. | |
| 6,157,673 A * | 12/2000 | Cuccia | ....................... 375/240 |
| 6,219,067 B1 | 4/2001 | Dieterich | |
| 7,406,249 B2 * | 7/2008 | Shirakawa et al. | ............ 386/95 |
| 2002/0008781 A1 | 1/2002 | Corl et al. | |
| 2003/0157905 A1 * | 8/2003 | Holmqvist | ................... 455/102 |
| 2003/0189953 A1 * | 10/2003 | Matsumura et al. | ......... 370/503 |
| 2005/0034031 A1 | 2/2005 | Gu | |
| 2006/0215749 A1 | 9/2006 | Imamura et al. | |
| 2007/0223536 A1 * | 9/2007 | Fukushima | .................. 370/503 |
| 2007/0286245 A1 * | 12/2007 | Yamada | ...................... 370/503 |
| 2008/0037591 A1 * | 2/2008 | Mori et al. | ................... 370/503 |

* cited by examiner

*Primary Examiner*—Chi H Pham
*Assistant Examiner*—Fan Ng
(74) *Attorney, Agent, or Firm*—Matthew D. Rabdau

(57) ABSTRACT

An analysis display has a coordinate plane of which coordinate axes are elapsed time and PCR (Program Clock Reference) time calculated using PCR extracted from header information of a transport stream packet. A box indicator representing an access unit is provided on the coordinate plane and sides of the box indicator indicate an arrival time of the access unit AU and time of time stamps PTS/DTS. It analyzes the PCR in a transport stream layer and the time stamps PTS/DTS in a PES layer in a manner of over layers, and displays an analysis result that allows easily understanding a relationship between system timing and them. Therefore, it makes it easier to check a problem on the PCR and the time stamps PTS/DTS.

16 Claims, 13 Drawing Sheets

STREAM ANALYSIS APPARATUS AND STREAM ANALYSIS DISPLAY METHOD

TECHNICAL FIELD

This invention relates to a stream analysis apparatus and a stream analysis display method.

BACKGROUND

FIG. 1 shows the structure of a transport stream. A transport stream standardized by ISO (International Organization for Standardization)/IEC (International Electrotechnical Commission) 13818-1 has transport stream packets (TS packets). Each TS packet has a fixed length of 188 bytes as shown in FIG. 1 (A) and has a TS header, adaptation field and/or payload. The TS header of the TS packet includes a sync byte for detecting the start of the TS packet, a transport error indicator for indicating whether there is a bit error in the TS packet, a PID (Packet Identifier) for identifying the packet, etc.

FIG. 1 (C) shows a structure of the adaptation field. The adaptation field is an area for providing additional information on each stream and a stuffing byte(s) (non-effective data byte). The adaptation field has an adaptation field length indicating the length of the adaptation field, a discontinuity indicator for indicating that the system clock is reset by the PID packet and a re-start, a random access indicator indicating a start of a sequence header of a video or an audio frame, a stream priority indicator indicating important portions of each stream. The adaptation field may further have optional field information and flag information for identifying information provided in the optional field.

FIG. 1 (D) shows a structure of the optional field. The optional field has PCR (Program Clock Reference) that is time reference information. The PCR is information that allows a receiver of the transport stream to recover a system clock of 27 MHz, and is that a 27 MHz system clock is encoded by 33bits. The PCR has two fields of a PCR base and a PCR extension. A value of the PCR indicates a packet generation time on time axis of the stream and the time unit is indicated as a counted value by accumulating an STC (System Time Clock) of 27 MHz (3.7037 nsec).

The optional field may have an OPCR indicating an original PCR, a splice count down indicating the number of transport packets of the same PID until an editable point.

In FIG. 1 (B), a payload following the TS header has packet data of a PES (Packetized Elementary Stream) of a video or audio bit stream.

FIG. 2 shows a structure of a PES packet. The PES packet has a packet start code indicating the start of a packet, packet length, flag information indicating whether there are PTS (Presentation Time Stamp) and/or DTS (Decoding Time Stamp) wherein the PTS is presentation time control information and the DTS is decoding time control information, a PES header length indicating a length of the PES header, a stuffing byte(s) for keeping the length of the packet data length constant whether PTS, DTS, PTS and/or DTS exist or not, and packet data of video or audio bit stream (ES: Elementary Stream).

When the video and audio data packets are separated from a transport stream, use of the PID for identifying each packet provided in the TS header allows separating the video and audio data packets. If the TS packets include a plurality of content data the video or audio packet of a desired content can be separated based on the PID. Specifically, a PAT (Program Association Table) of which PID="0x000 is received. The PAT indicates the PID of a PMT (Program Mapped Table) that shows structures of channels and details of the channels included in the transport stream. Use of the PID of the PMT indicated by the PAT allows selecting TS packets indicating the PMT of a desired channel.

The PMT may have a stream format identifier that shows which standard the video and audio bit stream constituting a program correspond to, and the PIDs of the video and audio bit stream. Then, the video and audio packets of a desired channel can be separated using the PIDs indicated by the PMT.

If the transport stream includes packets representing information on a content, for example, an EIT (Event Information Table) session, it is separated based on the PID wherein the EIT indicates name, start time, time length, content, genre, etc. of the program.

Video and audio data are obtained by decoding the elementary streams by extracting the video and audio PES packet data from the separated video and audio packets as described above. The elementary stream includes a picture type in the picture header and then it is identified as one of I, P and B pictures.

FIG. 3 shows a portion of a reference model of a transport system target decoder (TSTD) in an MPEG system.

A demultiplexer 11 of the transport system target decoder 10 separates video and audio packets based on the PID and provides the video packets to a transport buffer (TBn) 12 and the audio packets to a transport buffer (TBn) 16. The transport buffer (TBn) 12 stores the provided video packets and provides multi-buffer (MBn) 13 at a constant rate. The multi-buffer (MBn) 13 buffers multi-jitters and overhead of the PES to adjust the data transfer speed to an elementary stream buffer (EBn) 14. The elementary stream buffer (EBn) 14 is equivalent to a VBV (Video Buffering Verifier) buffer that prevents overflow and underflow when a video decoder 15 decodes the video elementary stream. A transport buffer (TBn) 16 stores the provided audio packets to provide them to buffer (Bn) 17 at a constant rate. The buffer (Bn) 17 is a buffer that prevents overflow and underflow when an audio decoder 18 decodes the audio elementary stream.

The video decoder 15 and audio decoder 18 extract the video and audio data from the buffers according to the time information of the time stamps PTS/DTS for decoding and presentation. The video and audio have a unit of decoding/presentation called "access unit". The DTS indicates a decoding time of the access unit and the PTS does a presentation time. The time stamps PTS/DTS are a clock of 90 kHz units encoded by 33 bits and synchronized to the PCR as the reference.

PCR, PES, etc. analysis has been conducted as a transport stream analysis analyzing such a transport stream described above.

FIG. 4 is a PCR analysis result that shows the relationship between PCR arrival times and the PCR time calculated based on the PCR wherein PCR indicators are provided on a coordinate plane of which horizontal axis is elapsed time and vertical axis is the PCR time. The PCR time is the time provided by multiplying a count value described in the PCR and a time of one period of the system clock (27 MHz). If the PCR is accurate, the PCR time calculated based on the respective PCRs and the arrival times of PCR1, PCR2, . . . have a proportional relationship so that the PCR indicators are substantially aligned on a linear line. Then, a receiver end of the transport stream controls the STC to make a gap between the PCR and STC be "0" to synchronize transmitter and receiver ends of the transport stream.

FIG. 5 shows an analysis result of PCR accuracy, for example. This analysis shows a time difference (a count error between an STC count value and a count value provided by the PCR) between an arrival time and a PCR time calculated based on the PCR at each position (each arrival time of the PCR) that the PCR packet exists on the stream. In FIG. 5, the horizontal axis shows arrival times and the vertical axis shows a time difference (a count error between a STC count value and a count value provided by the PCR) between an arrival time and a PCR time calculated based on the PCR. The STC is controlled to make a difference from the PCR be "0" so that a time difference (count error) is almost "0" when the PCR is accurate as shown in FIG. 5. If the time difference (count error) is large, it apparently shows that the PCR does not have an accurate value.

FIG. 6 also shows an analysis result of time stamps PTS/DTS. In FIG. 6, PTS/DTS values (PTS/DTS×11.11 μsec) are placed with respect to each access unit. The vertical axis shows an elapsed time from the DTS value to the PTS value of the access unit. An "X" mark indicates a PTS, a "+" mark does a DTS. In FIG. 6, an additional summary display on an access unit selected by a cursor is provided to display various information regarding the access unit.

FIG. 7 is another method of displaying analysis results of time stamps PTS/DTS wherein the horizontal axis is a time axis and it shows relationship between an arrival time of an access unit and time provided by the time stamps PTS/DTS described in each access unit. In FIG. 7, a position indicated with "A" is an arrival time of an access unit, a time provided by the PTS described in the access unit is indicated at a "P" position, and a time provided by the DTS is indicated at a "D" position.

SUMMARY

A conventional analyzer can analyze a PCR existing in a transport stream layer but does not feature an analysis of time stamps PTS/DTS in a PES layer when it analyzes a transport stream. In an analysis of PES, it features an analysis of time stamps PTS/DTS to display them on a time axis but does not feature an analysis of the relationship between a PCR and the time stamps in a TS layer.

If the conventional analyzer does not provide an analysis of relationship over layers, it is difficult to verify a problem related to the PCR and the time stamps PTS/DTS when the stream has a timing sync problem.

If a timing problem is analyzed by displaying an arrival time of an access unit and times provided by time stamps PTS/DTS on a time axis of a referred PCR as shown in FIG. 7, and a scale of the time axis is selected as the arrival time and the times provided by the time stamps PTS/DTS concerning one access unit are displayed, a relationship between the arrival time and the times provided by the time stamps PTS/DTS may not be displayed when a time distance between the arrival time of the access unit and the times provided by the time stamps PTS/DTS is moving apart, for example.

Then an embodiment of the present invention provides stream analysis apparatus and stream analysis display method for easily analyzing a transport stream.

A stream analysis apparatus according to an embodiment of the present invention has packet header extracting process means for extracting header information from a transport stream packet, time stamp extracting means for extracting a time stamp from the transport stream packet, clock generation process means for generating a clock signal as a reference of presentation timing of content data transmitted by the transport stream packet, and analysis process means for analyzing an access unit transmitted by the transport stream packet using a PCR (Program Clock Reference) extracted by the packet header extracting means, the clock and the time stamp wherein the analysis process means generates a display signal for displaying an analysis result having a box indicator representing the access unit on a coordinate plane of which axes are elapsed time and PCR time calculated using the PCR to indicate an arrival time of the access unit and a time of time stamp by the sides of the box indicator.

A stream analysis display method according to an embodiment of the present invention is for a stream analysis apparatus that analyzes a transport stream, and has steps of providing a coordinate plane of which coordinate axes are elapsed time and PCR time calculated using PCR extracted from header information of a transport stream packet, and providing a box indicator representing the access unit on the coordinate plane wherein sides of the box indicator indicate an arrival time of the access unit and time of time stamp.

Embodiments of the present invention show a box indicator representing an access unit on a coordinate plane of which coordinate axes are elapsed time and PCR time calculated using PCR extracted from header information of transport stream packets, and sides of the box indicator indicate an arrival time of the access unit and time of time stamp. Therefore, it makes it easier to analyze the transport stream.

DETAILED DESCRIPTION

Figure 8:
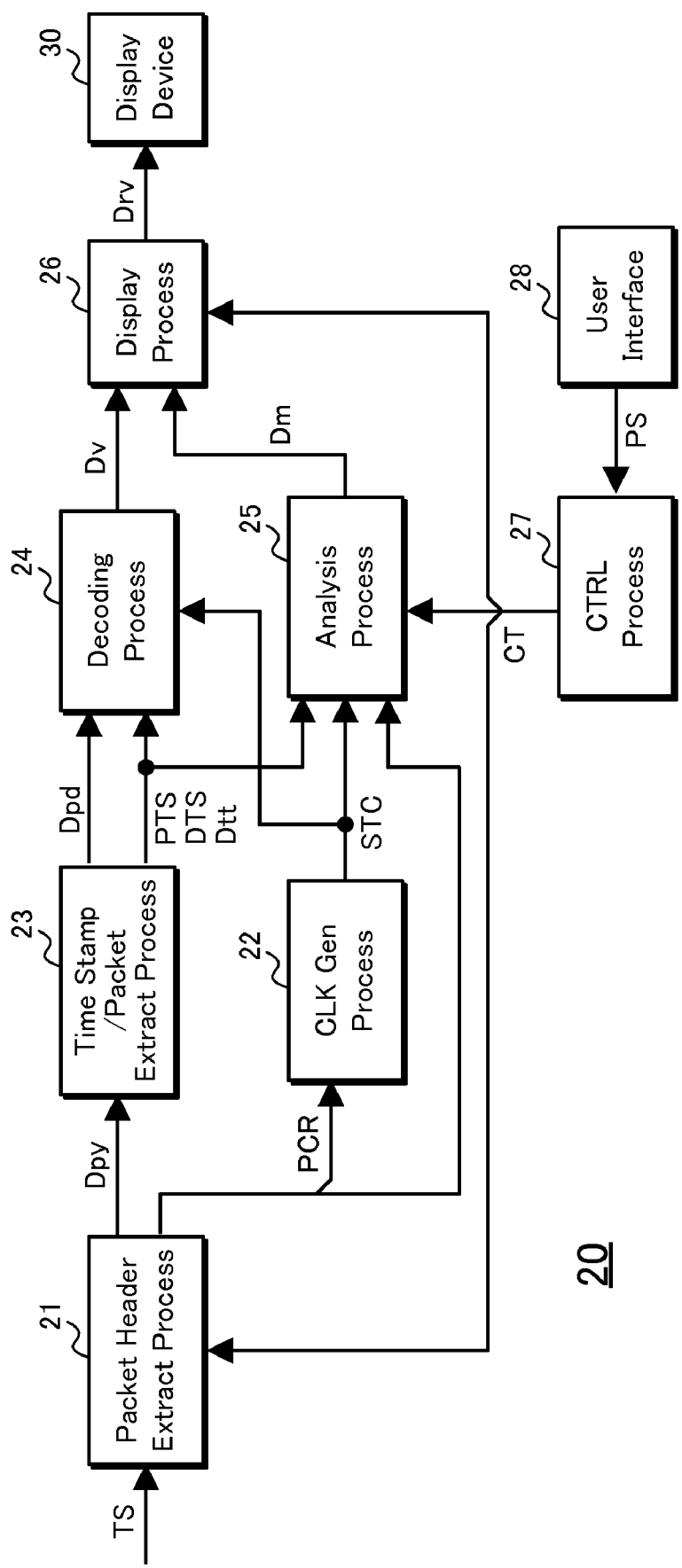
FIG. 8 is a figure that shows a structure of a stream analysis apparatus.

One of the embodiments according to the present invention is described below referring to figures. FIG. 8 is a functional block diagram of a stream analysis apparatus wherein each process block can be implemented with hardware or software.

A transport stream TS is provided to a packet header extraction processor of a stream analysis apparatus 20. The packet header extraction processor 21 extracts a PCR from a header and provides it to a clock generation processor 22 when a PCR flag in the adaptation field of the header of a transport stream packet (TS packet) indicates that the PCR is provided. In addition, if it identifies the payload data as a desired video or audio encoded stream based on a PID included in the header of the TS packet, it separates the payload data Dpy to provide it to a time stamp/packet extraction processor 23.

The clock generation processor 22 has an oscillator of 27 MHz and controls the oscillator to make a difference between a count value of a clock generated by the oscillator and an STC (System Time Clock) provided by the PCR be "0" by comparing them to generate an STC synchronized with the transport stream TS and provide it to decoding processor 24 and analysis processor 25. The analysis processor 25 also receives the PCR from the packet header extraction processor 21.

The time stamp/packet extraction processor 23 recovers each PES packet sequentially using the data Dpy from the packet header extraction processor 21. The time stamp/packet extraction processor 23 extracts time stamps PTS/DTS from a PES header to provide them to the decoding processor 24 and analysis processor 25 when PTS and DTS flags in the PES header indicate there is a PTS or DTS. The time stamp/packet extraction processor 23 provides video and/or audio packet data Dpd from the PES packet to the decoding processor 24. It also provides packet data Dtt of TOT (Time Offset Table) and TDT (Time and Date Table) to the analysis processor 25.

The decoding processor 24 decodes the packet data Dpd from the time stamp/packet extraction processor 23 at timing that the STC from the clock generation processor 22 and the DTS from the time stamp/packet extraction processor 23 are aligned, and provides the decoded signal, such as video data Dv, to a display processor 26 at timing that the STC and PTS are aligned.

The analysis processor 25 analyzes the PCR in the transport stream layer, the time stamp in the PES layer, in a manner of over layers using the PCR or the STC provided from the clock generation processor 22, the time stamps PTS/DTS from the time stamp/packet extraction processor 23. Then, it generates display data Dm of an analysis result display and provides it to a display processor 26 for easily recognizing their relationship with the system timing.

The display processor 26 produces a display drive signal Drv using video data from the decoding processor 24 and the display data Dm from the analysis processor 25 and provides the display drive signal Drv to the display device 30 to display the video or the analysis result on the screen of the display device 30.

A control processor 27 is coupled to a user interface 28. The user interface 28 has operation keys, a touch panel, etc. and provides an operation signal PS to the control processor 27 according to a user operation.

The control processor 27 provides a control signal CT based on the operation signal PS to control the respective processors as they conduct an analysis and the analysis result is displayed according to the user operation.

Figure 9:
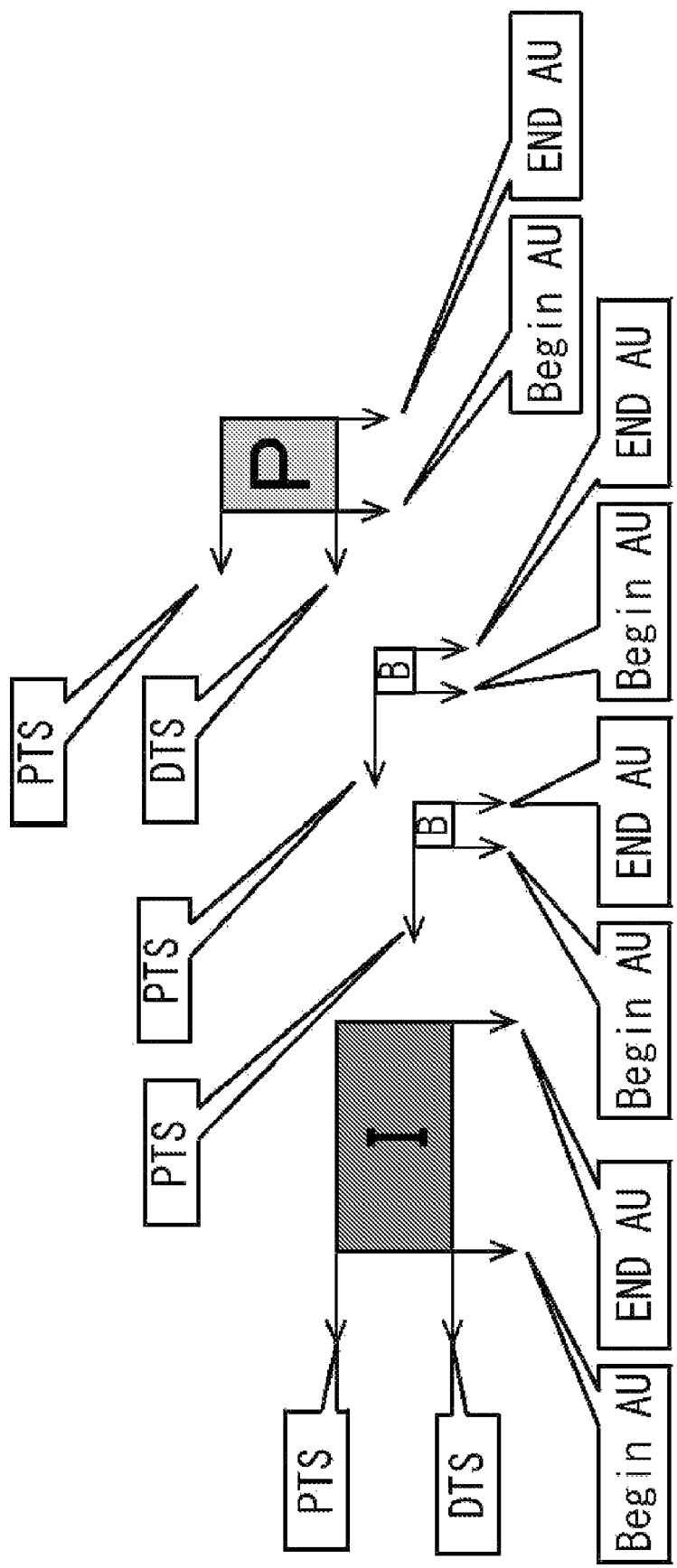
FIG. 9 is a figure that shows access unit indicators.

Now behaviors of the analysis processor 25 are described. The analysis processor 25 displays an access unit in the shape of a box as shown in FIG. 9, wherein one axis direction indicates the arrival time and the other axis direction does the time stamps PTS/DTS for easily understanding the relationship between the arrival time and the time stamps PTS/DTS. For example, the access unit is displayed as a box indicator and the left side indicates an arrival time of the first data byte that is the start of the access unit, and the right side indicates an arrival time of the last data byte that is the end of the access unit. The bottom side of the box indicator shows the DTS and the upper side does the PTS. Therefore, if a transmission time of the access unit is longer the box indicator is horizontally longer and if a time difference between the time stamps PTS/DTS is longer the box indicator is vertically longer.

The box-shaped access unit indicator can be identified by which type of pictures among intraframe coding, and interframe predictive coding and bidirectionally predictive coding. For example, the box indicator may have a mark "I" indicating an intraframe coded picture (I picture), a mark "P" indicating an interframe predictive coded picture (P picture) or a mark "B" indicating an interframe bidirectionally predictive coded picture (B picture). As described, an indicator to show a video coded type is provided, the data of the access unit can be easily identified by which picture type correspond to the data. The indication of the picture type may have different colors or intensities with respect to each picture as can be identified with each picture type.

Note that the bidirectionally predictive coded picture has only the PTS and not the DTS. Therefore, the box indicator of the access unit representing the bidirectionally predictive coded picture indicates the PTS with only the upper side and the lower side may be located at a predetermined time before the PTS, for example.

Figure 1:
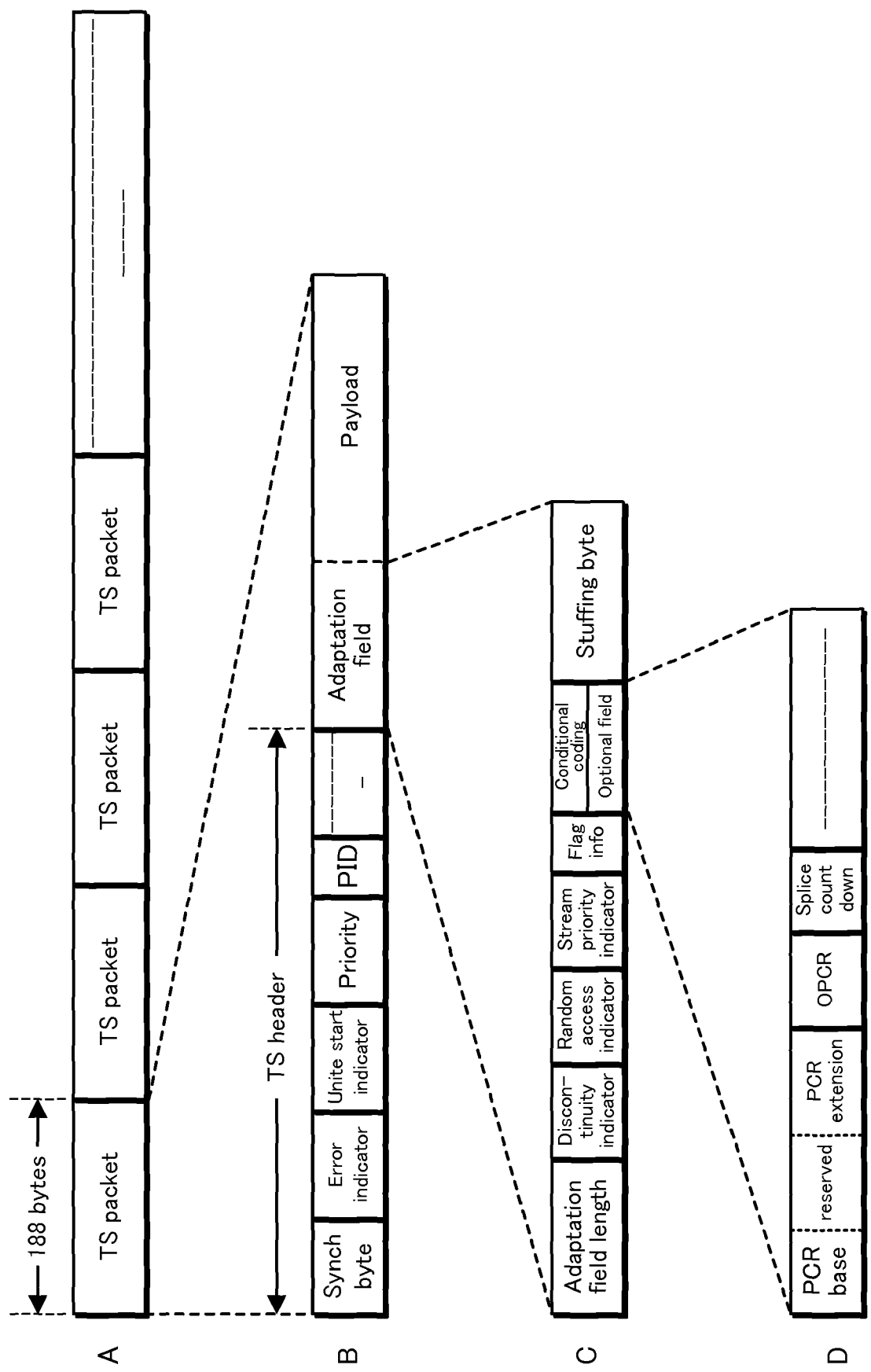
FIG. 1 is a figure that shows a structure of a transport stream.
Figure 2:
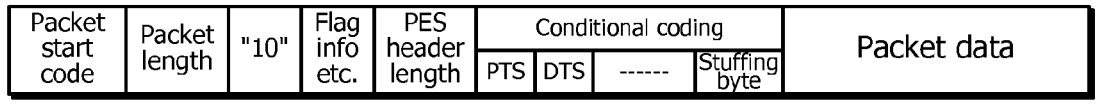
FIG. 2 is a figure that shows a structure of PES packets.
Figure 3:
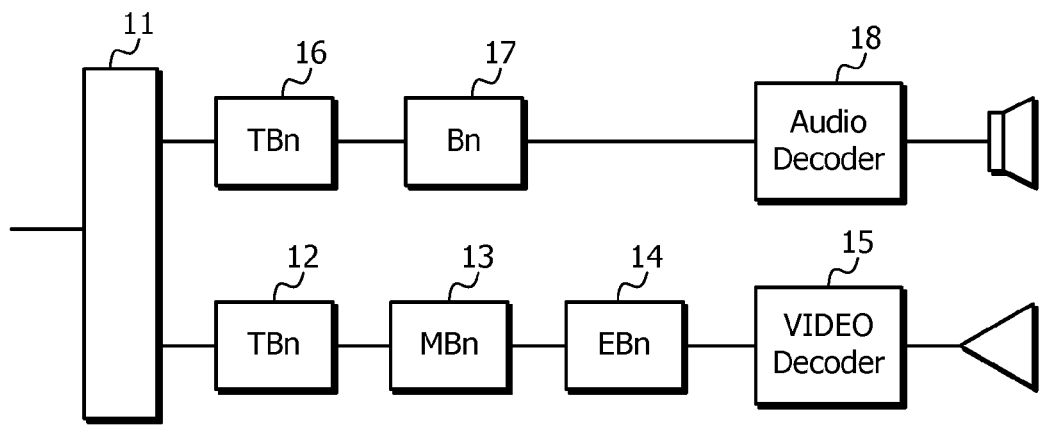
FIG. 3 is a figure that shows a portion of a reference model of a transport stream system target decoder.
Figure 4:
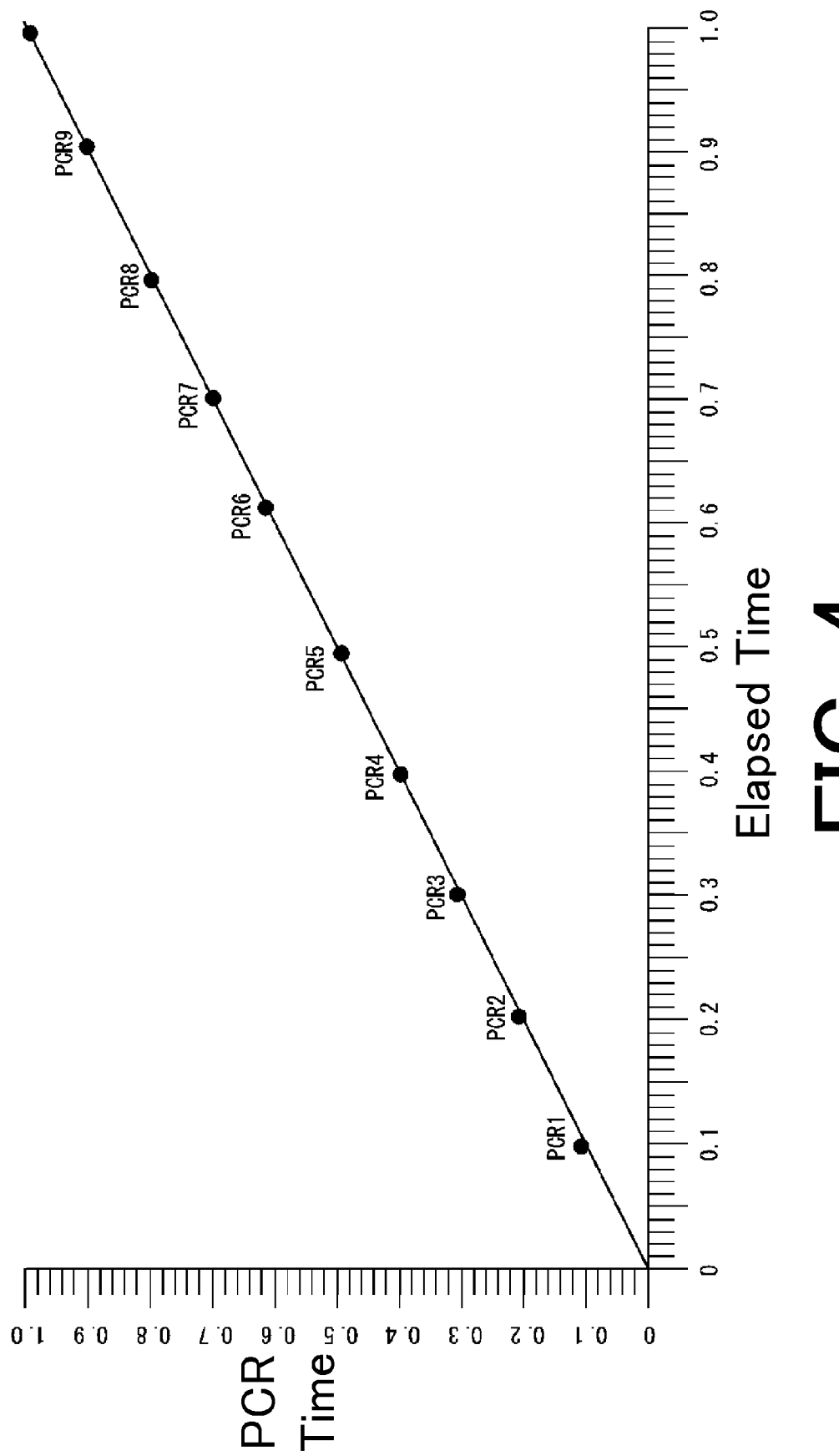
FIG. 4 is a figure that shows a PCR analysis result.
Figure 5:
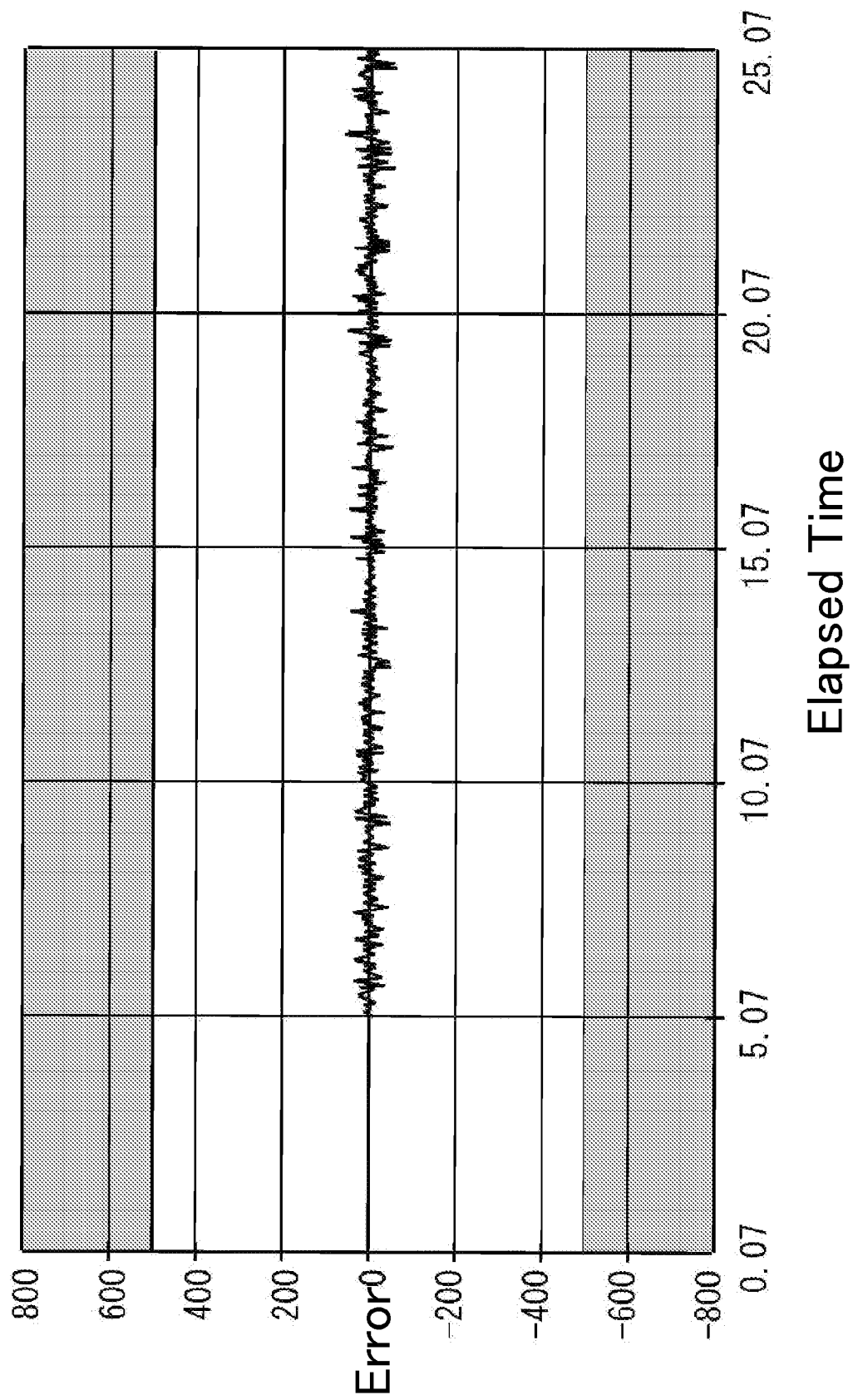
FIG. 5 is a figure that shows an analysis result of PCR accuracy.
Figure 10:
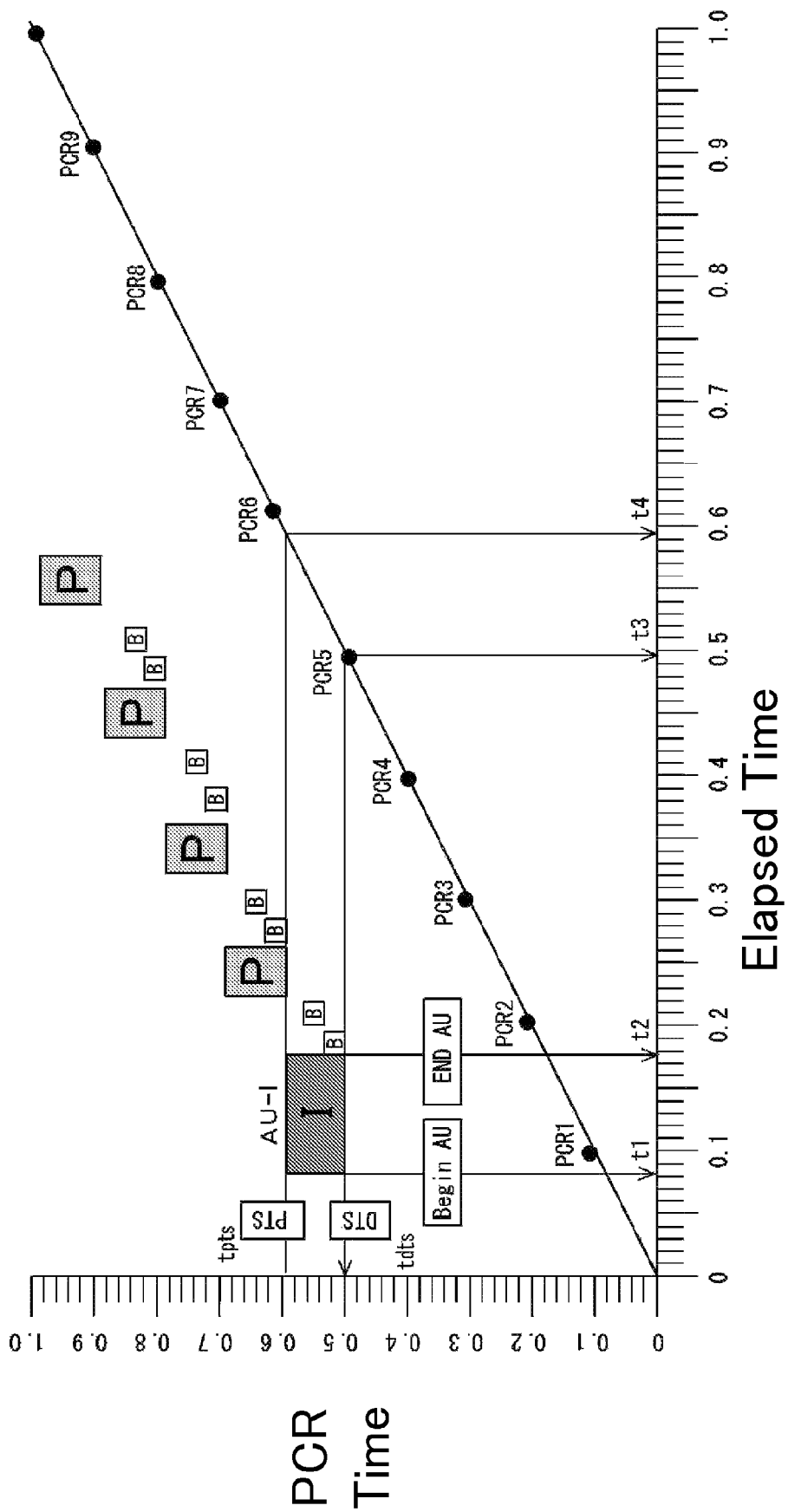
FIG. 10 is a figure that shows PCR analysis result display with access unit indicators.

FIG. 10 provides access unit indicators in addition to the analysis result of PCR arrival times and PCR time shown in FIG. 4 wherein the horizontal axis of FIG. 10 is elapsed time and the vertical axis is the PCR time. In this display method, the elapsed time may be evaluated by predicting it based on an accumulated value of packets in case of a fixed bit rate, and by using time information obtained from the time stamp that is recorded when the TS packet arrives in case of a transport stream of a variable bit rate.

Figure 6:
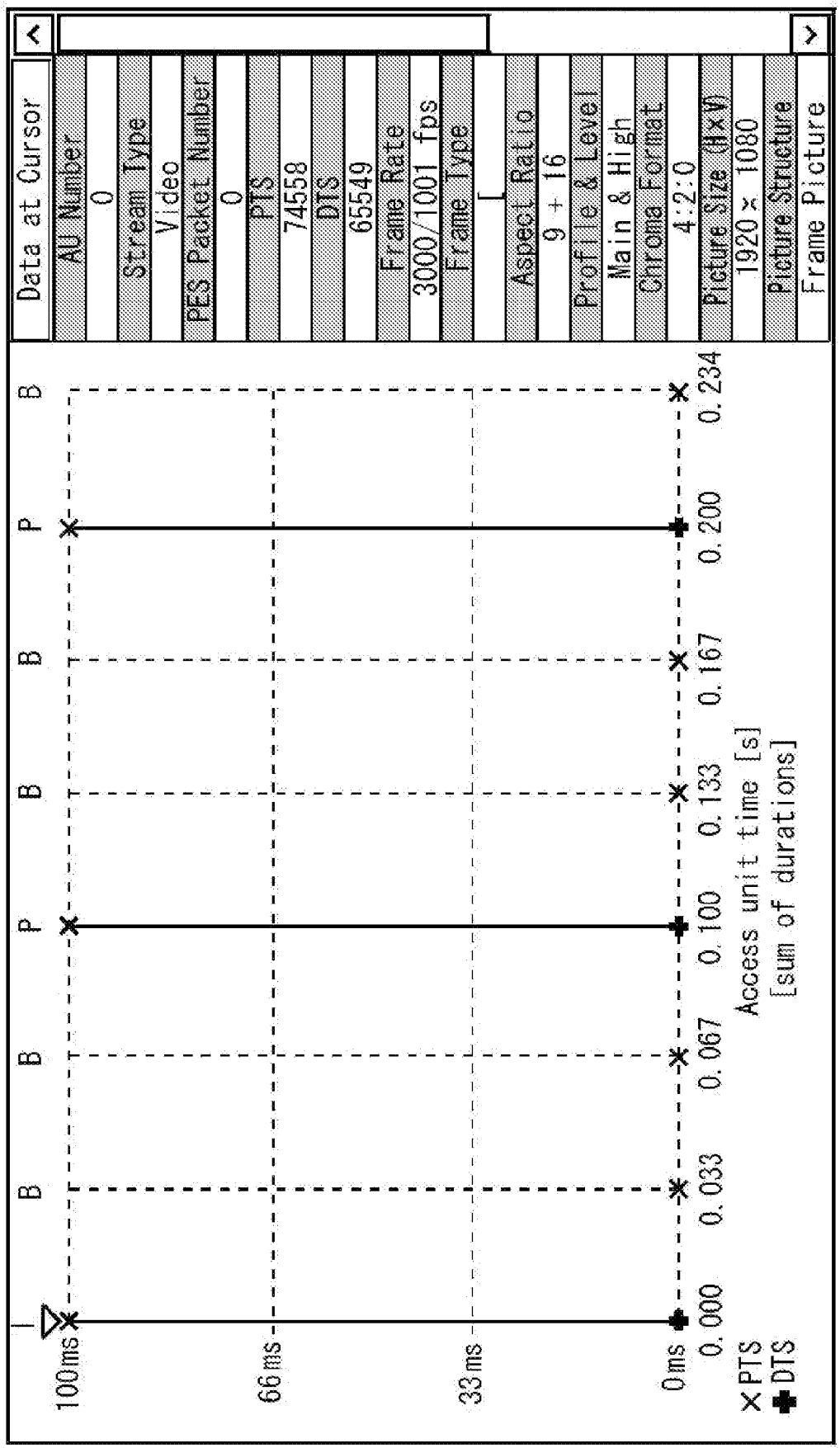
FIG. 6 is a figure that shows an analysis result of time stamps PTS/DTS.
Figure 7:
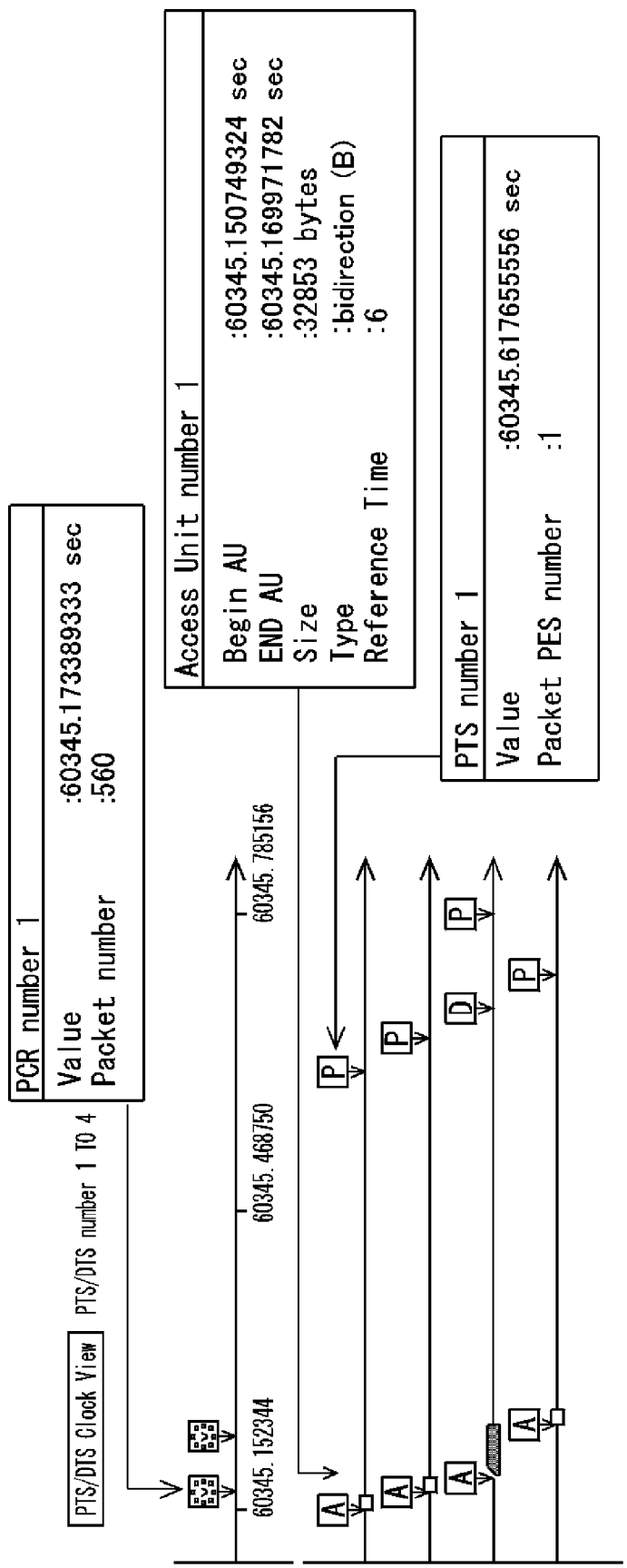
FIG. 7 is a figure that shows another method of displaying an analysis result of time stamps PTS/DTS.

The upper and lower sides of the box indicator representing the access unit indicate the time stamps PTS/DTS. That is, the upper and lower sides of the box indicator representing the access unit indicates the analysis result of the time stamps PTS/DTS of FIG. 6. Besides, if the times provided by the time stamps PTS/DTS on the vertical axis of FIG. 10 are assigned to the horizontal axis, a relationship between an arrival time of the access unit and the stamps PTS/DTS is shown.

For example, when an access unit AU-I arrives during a period from a time t1 to a time t2, the DTS indicates a time tdts and the PTS indicates a time tpts, if the time indicated by the DTS is assigned to the horizontal axis, the time tdts is assigned to a time t3. If the time indicated by the PTS is assigned to the horizontal axis the time tpts is assigned to a time t4. Therefore, it shows that the access unit AU-I is decoded when a time (t3-t2) has passed after the arrival of the access unit AU-I and the decoded access unit AU-I is provided when a time (t4-t2) has passed after the arrival of the access unit AU-I.

Because the PCR arrival times and the PCR indicators, such as PCR1-PRC 9, based on the PCR time are displayed on the same time axis, the PCR in the transport stream layer, the time stamp in the PES layer, etc. are analyzed in a manner of over layers so that a relationship between the system timing and them are easily understood.

A time difference between the access unit arrival time and the time indicated by the PTS are basically fixed when the stream is generated. Therefore, if the time differences are measured to evaluate the average and detect a value significantly departing from the average, an abnormal time stamp having an error in remultiplexing can be found.

In case of a video stream generated at 29.97 frames/sec, the time stamps PTS/DTS are derived from encoding a clock of 90 kHz units by 33 bits and one frame corresponds to 3003 clocks. That is, the PTS counter accumulates 3003 counts every access unit in order of the display frame. Since the time stamps PTS/DTS indicate time positions synchronized with the PCR, a change characteristic of the count value described in the PTS is a change characteristic CBpts indicated with a dotted line of FIG. 11 and rises in parallel to a change characteristic CBpcr of a count value described in the PCR. Therefore, a problem is also found by detecting a value that is departing from an average Dtc of differences between the change characteristics CBpts and CBpcr.

Figure 11:
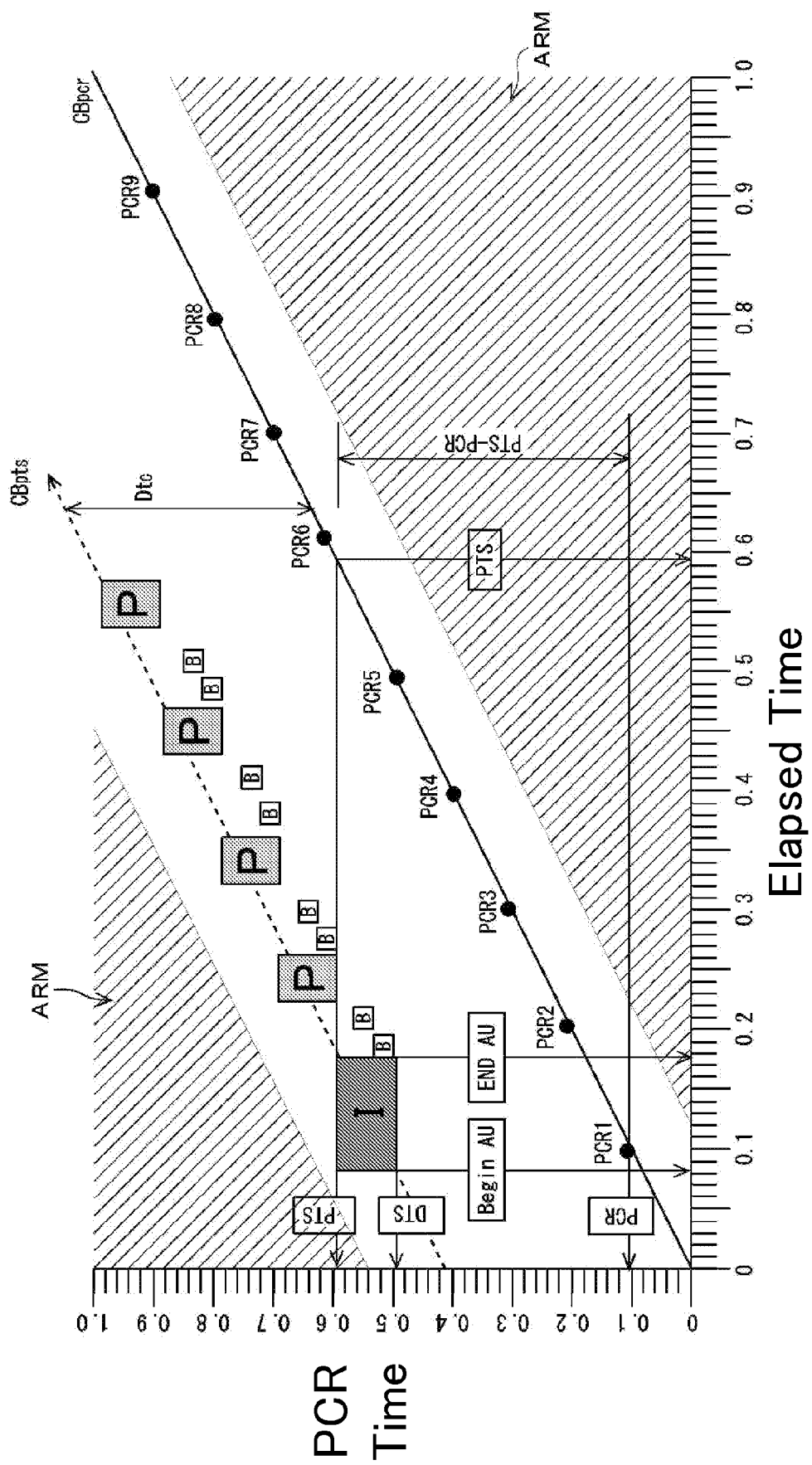
FIG. 11 is a figure that shows alarm notice areas.

An alarm notice area ARM may be previously set as shown in FIG. 11 and when a box indicator representing an access unit is displayed in the alarm notice area ARM, a problem is indicated by changing a display color, indicating an alarm, using sound, etc. for easily identifying whether the problem is occurring.

A user may set the alarm notice area ARM according to characteristics of a receiver, for example. The alarm notice area ARM may be an area that a PCR error is over a predetermined time range relative to the time based on the STC. That is, an area over the predetermined time range relative to the change characteristic CBpcr is set to the alarm notice area ARM. As described, if the alarm notice area ARM is provided, a position of an "O" mark of a PCR indicator is in the alarm notice area ARM when the PCR has an error and the trouble is easily founded.

An area that a time difference between an access unit arrival time and a time indicated by the PTS is over a predetermined time arrange may be another alarm notice area ARM. By such an alarm notice area ARM setting, a box indicator representing an access unit extends into the alarm notice area ARM when the time stamps PTS/DTS have an abnormal vale, and then the trouble is easily identified.

When the position of the "O" mark indicating the PCR arrival is in or the box indicator representing the access unit extends into the alarm notice area ARM, alarm characters indicating the trouble may be displayed or display color may be changed so the trouble can be easily and certainly founded.

A program has a caption, data, etc. as elements in addition to the video, audio and PCR, and their packets are separated using the PIDs for identifying the packets provided in the TS header. A TS packet providing a PMT of a desired channel can be selected using the PID of the PMT indicated by the PAT of the PID="0x000".

The PMT has a stream format identifier indicating which format the video and audio bit streams constituting a program correspond to, and the PIDs of the video and audio bit streams. Then, the video and audio packets of a desired channel can be separated with a filtering process using the PIDs indicated by the PMT.

Figure 12:
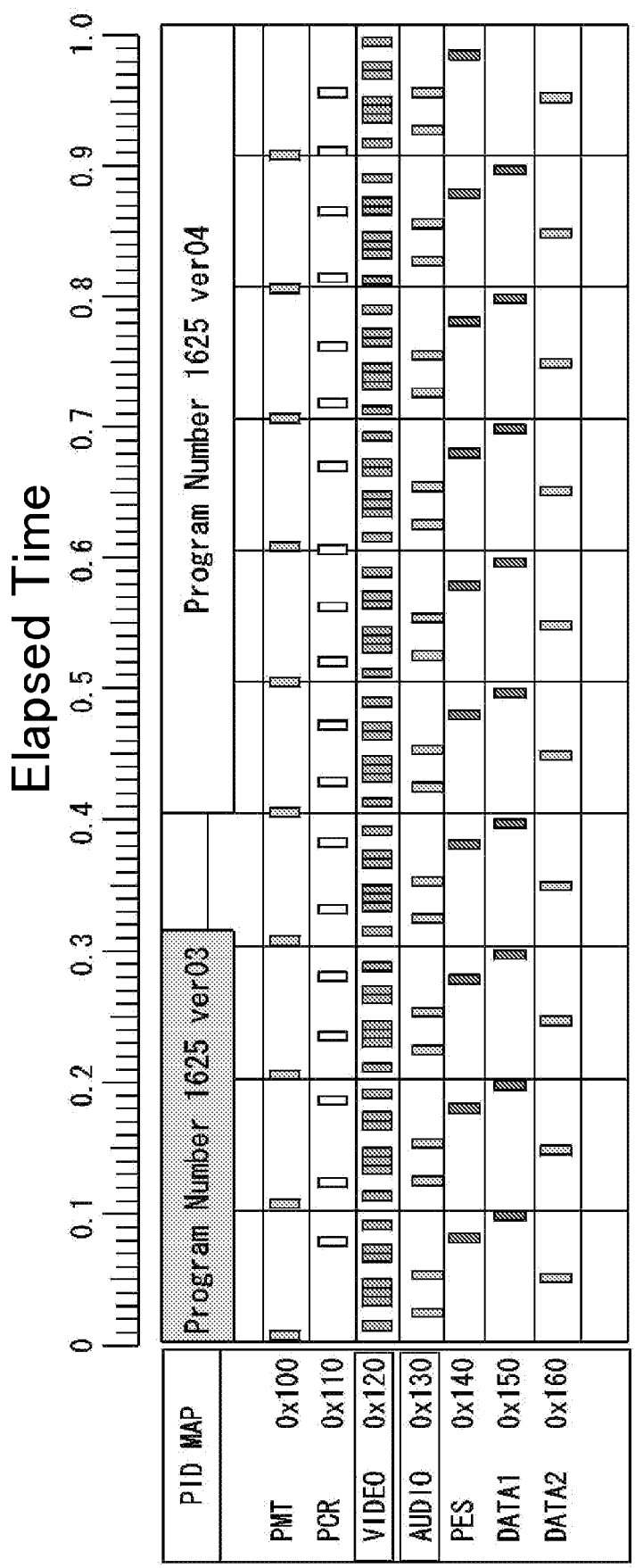
FIG. 12 is a figure that shows an analysis result of TS packets.

FIG. 12 is an analysis result of TS packets wherein the horizontal axis is time and the vertical axis shows types of the PIDs. In this analysis result, sets of TS packets of PMT, PCR, VIDEO, AUDIO, Caption (PES), data (DATA1, DATA2) are listed in order of arrival time. Then, a relationship between the TS packets transmitting the access unit and the PMT can be analyzed in detail. The version number of the PMT is updated when the program is updated. Then, the difference of the version number of the PMT section may be visually and easily identified by differently displaying it depending on the version number, such as, displaying it in different colors.

Figure 13:
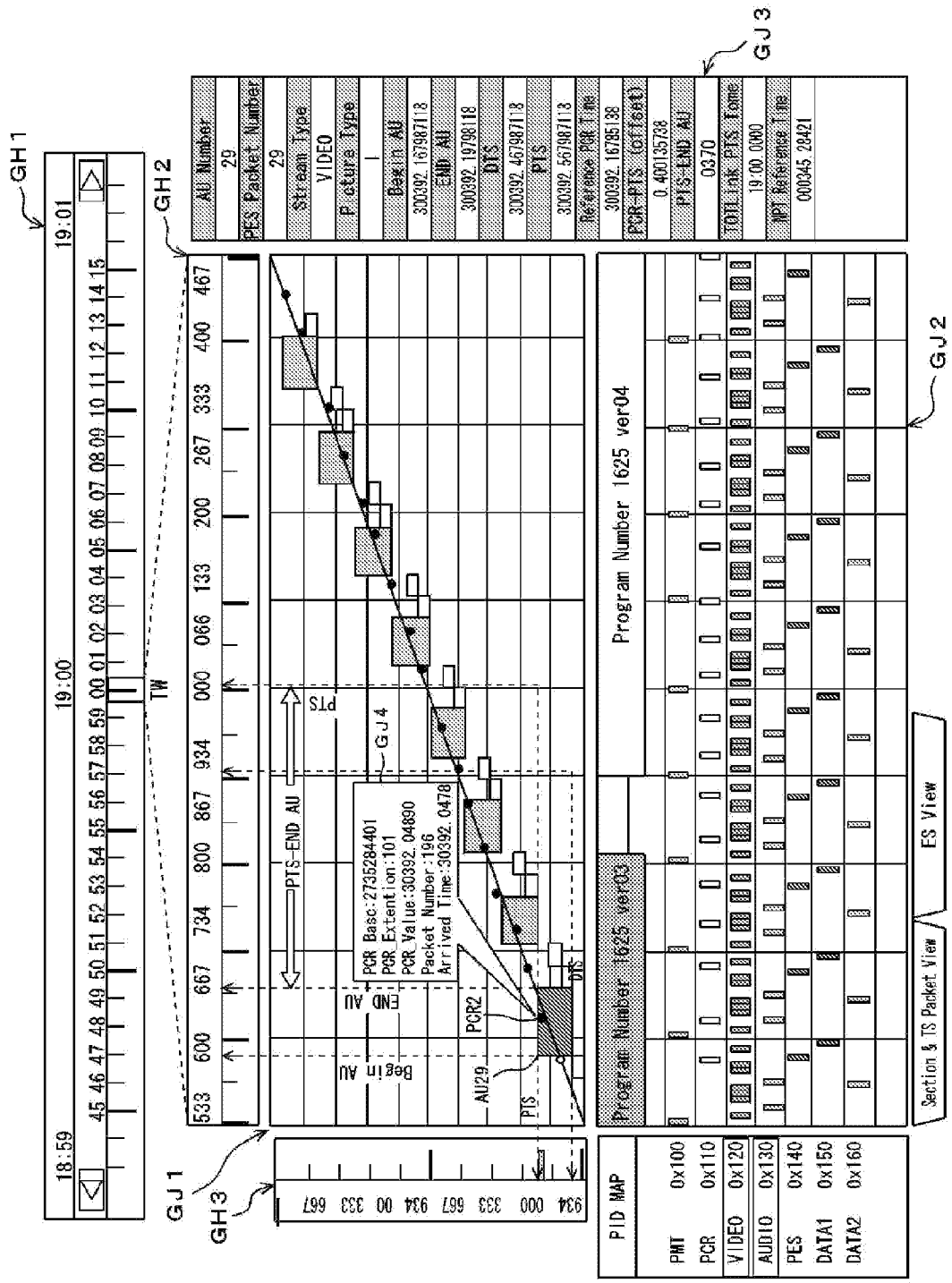
FIG. 13 is a figure that shows an analysis result display.

FIG. 13 is an analysis display that arranges the analysis results shown in FIGS. 11 and 12 in parallel. A transport stream transmits TOT or TDT that indicates present time as program arrangement information SI (Service Information). The PCR is relative time information. Then, it can display a relationship between the analysis result and the time by linking a coordinate axis indicating the time based on the present time provided by the TOT or TDT, and a coordinate axis indicating the arrival times.

FIG. 13 shows a coordinate indicator GH1 that is an axis showing time based on present time indicated by the TOT or TDT. A time range TW in the coordinate indicator GH1 corresponds to a time range displayed with a coordinate indicator GH2. Arrival times of access unit, etc. can be identified with the time of the coordinate indicator GH2. A coordinate indicator GH3 shows a time coordinate indicated by the PCR time or time stamps PTS/DTS.

The coordinate indicator GH1 and the coordinate indicators GH2 and GH3 are linked and when a time "19:00:00" is selected as a reference as shown in FIG. 13, positions "000" in the coordinate indicators GH2 and GH3 indicate the time "19:00:00".

An analysis display GJ1 uses box indicators representing access units corresponding to the times of the coordinate indicators GH2 and GH3. Therefore a coordinate of the left side of a box indicator shows an arrival time of the first data byte of the access unit. A coordinate of the right side of the box indicator shows an arrival time of the last data byte of the access unit. A coordinate of the upper side of the box indicator shows an output time of decoded data. Further, when the access unit is I or B picture data, a coordinate of the lower side of the box indicator shows a time of decoding. For example, in case of an access unit AU29, the analysis display GJ1 and the coordinate indicators GH through GH3 clearly show that an arrival time of the first data byte is about "18:59:59:580", an arrival time of the last data byte is about "18:59:59:660", a time of decoded data output is "19:00:00:000", and a time of decoding is about "18:59:59:940".

An analysis display GJ2 lists sets of TS packets of PMT, PCR, VIDEO, AUDIO, Caption (PES) and data (DATA1, DATA2) corresponding to the time of the coordinate indicator GH2 in order of arrival time. This allows identifying arrival times of the respective sets of the TS packets as well as analyzing a relationship between the TS packets transmitting the access unit and the PMT in detail. When the PMT is updated by version upgrade of a program number, the update of the version indicator, and the PMT packets before and after the update are differently displayed. Then, it visually and easily shows how timing the version update starts.

In FIG. 13, it further has a summary display GJ3. A cursor (not shown) may be displayed on the display and a user selects a box indicator with the cursor to select the corresponding access unit and then the summary display GJ3 displays information on the selected access unit. For example, when the access unit AU29 is selected, it displays information of access unit number, PES packet number, stream type, picture type, count values at arrivals of the first and last data byte, count values indicated by the DTS or PTS, etc.

In FIG. 13, it has a pop-up display GJ4 that displays information on a selected PCR when a user selects the PCR indicator. For example, when a PCR2 indicator is selected, the pop-up display shows values of two fields PCR base and PCR extension, packet number, etc.

The display of FIG. 13 can show packet arrival time, decoding start time, data output time after decoding, etc. but does not show what video or audio data is. Then, decoding results may be provided in the analysis result display so as to understand what video or audio data is as described below.

Figure 14:
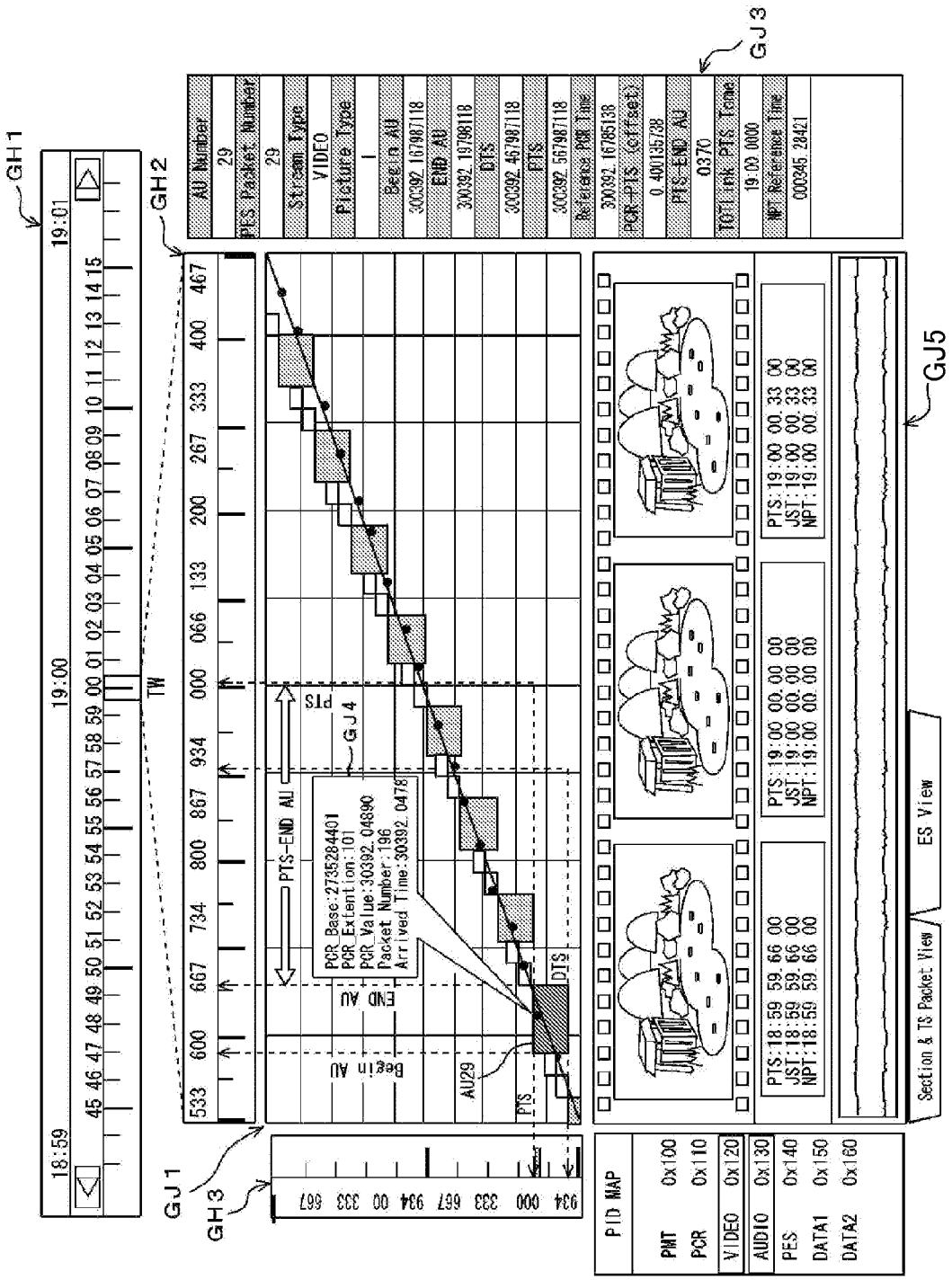
FIG. 14 is a figure that shows an analysis result display with decoding results.

FIG. 14 shows a case that provides decoding results in the analysis result display. In case of video or audio waveform display, an analysis display GJ5 showing the video or audio waveform is provided in place of the analysis display GJ2, for example. The analysis display GJ5 also displays videos presented at the reference time and around the frame when the time range TW is provided in the coordinate indicator GH1. Audio waveforms around the reference time are also displayed.

As described, it makes it easy to understand what content the access unit has by displaying video and audio waveform.

What is claimed is:

1. A stream analysis apparatus comprising:
   packet header extracting means for extracting header information from a transport stream packet;
   time stamp extracting means for extracting a time stamp from the transport stream packet;
   clock generation process means for generating a clock signal as a reference of presentation timing of content data transmitted by the transport stream packet; and
   analysis process means for analyzing an access unit transmitted by the transport stream packet using a PCR (Program Clock Reference) extracted by the packet header extracting means, the clock and the time stamp wherein the analysis process means generates a display signal for displaying an analysis result having a box indicator representing the access unit on a coordinate plane of which axes are elapsed time and PCR time calculated using the PCR with one pair of the opposing sides of the box indicator indicating the first and last data arrival time of the access unit respectively and one side of another pair of the opposing sides of the box indicator indicating PTS (Presentation Time Stamp) of the access unit.

2. The stream analysis apparatus as recited in claim 1 wherein the analysis process means provides the display signal of the box indicator so as to visually identify that the data of the access unit is which type of picture among intraframe predictive coding, interframe predictive coding and bidirectionally predictive coding.

3. The stream analysis apparatus as recited in claim 1 wherein the analysis process means provides a PCR indicator based on the arrival time of the PCR and the PCR time in the analysis result display.

4. The stream analysis apparatus as recited in claim 1 wherein the analysis process means identifies the transport stream packets using PIDs (Packet Identifier) extracted by the packet header extracting processor means, and provides indicators of arrival times of the transport stream packets with respect to each PID on the elapsed time as a coordinate axis in the analysis result display.

5. The stream analysis apparatus as recited in claim 1 further comprising packet extracting means for extracting a packet of TOT (Time Offset Table) or TDT (Time and Data Table) from the transport stream packet wherein the analysis process means links a coordinate axis representing time based on present time provided by the TOT or TDT extracted by the packet extracting means and the coordinate axis for indicating the arrival time.

6. The stream analysis apparatus as recited in claim 1 further comprising user interface process means wherein the analysis process means provides the analysis result display with an information display on an access unit that is selected by selecting a box indicator representing the access unit with the user interface process means.

7. The stream analysis apparatus as recited in claim 1 further comprising:
   decoding process means for decoding the access unit;
   display process means for combing the analysis result display and display of a decoded result of the decoding process means; and
   user interface process means wherein when an access unit is instructed to be presented with the user interface process means, the decoding process means decodes the instructed access unit, and the instructed access unit is displayed so as to be identified in the analysis result display.

8. The stream analysis apparatus as recited in claim 1 wherein another side of the another pair of the opposing sides of the box indicator indicates DTS (Decoding Time Stamp) of the access unit if the access unit is a type of the intraframe predictive coding or the interframe predictive coding.

9. A stream analysis display method for a stream analysis apparatus analyzing a transport stream, comprising steps of:
   providing a coordinate plane of which coordinate axes are elapsed time and PCR time calculated using PCR (Program Clock Reference) extracted from header information of a transport stream packet; and
   providing a box indicator representing an access unit on the coordinate plane wherein one pair of the opposing sides of the box indicator indicating the first and last data arrival time of the access unit respectively and one side of another pair of the opposing sides of the box indicator indicating PTS (Presentation Time Stamp) of the access unit.

10. The stream analysis display method as recited in claim 9 wherein the display signal of the box indicator is provided so as to visually identify that the data of the access unit is which type of picture among intraframe predictive coding, interframe predictive coding and bidirectionally predictive coding.

11. The stream analysis display method as recited in claim 9 wherein a PCR indicator is provided based on an arrival time of the PCR and the PCR time in the analysis result display.

12. The stream analysis display method as recited in claim 9 further comprising a step of identifying the transport stream packets using PIDs (Packet Identifier) included in the header information for displaying arrival times of the transport stream packets with respect to each PID on the elapsed time as a coordinate axis.

13. The stream analysis display method as recited in claim 9 further comprising a step of displaying a coordinate axis of time based on present time provided by a packet of TOT (Time Offset Table) or TDT (Time and Data Table) extracted from the transport stream packet wherein the coordinate axis of the time is linked with the coordinate axis for indicating the arrival time.

14. The stream analysis display method as recited in claim 9 further comprising a step of displaying information on an access unit that is selected by selecting a box indicator representing the access unit.

15. The stream analysis display method as recited in claim 9 further comprising a step of displaying a decoded result of an access unit when the access unit is instructed to be presented.

16. The stream analysis display method as recited in claim 9 wherein another side of the another pair of the opposing sides of the box indicator indicates DTS (Decoding Time Stamp) of the access unit if the access unit is a type of the intraframe predictive coding or the interframe predictive coding.

* * * * *